United States Patent
Canfield

(10) Patent No.: US 6,274,262 B1
(45) Date of Patent: Aug. 14, 2001

(54) FUEL CELL BI-COOLER FLOW PLATE

(75) Inventor: Franklin L. Canfield, Delmar, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/382,296

(22) Filed: Aug. 24, 1999

(51) Int. Cl.[7] .................................................. H01M 2/00
(52) U.S. Cl. ............................. 429/34; 429/26; 429/36; 429/38; 429/39; 429/30; 429/13; 429/72; 429/210; 29/623.1
(58) Field of Search .................. 429/26, 36, 34, 429/30, 38, 39, 72, 13, 210; 29/623.1

(56) References Cited

U.S. PATENT DOCUMENTS

| | | |
|---|---|---|
| 4,431,714 | * 2/1984 | Myerhoff .............................. 429/26 |
| 4,956,245 | 9/1990 | Shimizu et al. . |
| 4,988,583 | 1/1991 | Watkins et al. . |
| 5,108,849 | 4/1992 | Watkins et al. . |
| 5,773,160 | 6/1998 | Wilkinson et al. . |
| 5,776,624 | 7/1998 | Neutzler . |
| 5,858,569 | * 1/1999 | Meacher et al. ....................... 429/26 |
| 5,998,054 | * 12/1999 | Jones et al. ............................ 429/34 |
| 6,066,408 | * 5/2000 | Vitale et al. ........................... 429/26 |

* cited by examiner

Primary Examiner—Carol Chaney
Assistant Examiner—Angela J. Martin
(74) Attorney, Agent, or Firm—Trop, Pruner & Hu, P.

(57) ABSTRACT

A fuel cell stack includes flow plates that are arranged to communicate reactants through the fuel cell stack. The flow plates include an anode cooler plate that is substantially identical to a cathode cooler plate of the flow plates.

29 Claims, 5 Drawing Sheets

FUEL CELL BI-COOLER FLOW PLATE

BACKGROUND

The invention relates to a fuel cell bi-cooler flow plate configuration that may serve as both an anode cooler plate and a cathode cooler plate.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

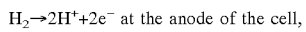

at the anode of the cell, and

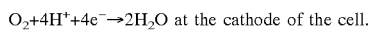

at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different flow plates that are stacked one on top of the other in the appropriate order, and each plate may be associated with more than one fuel cell of the stack. The plates may be made from a graphite composite or metal material and may include various flow channels and orifices to, as examples, route the above-described reactants and products through the fuel cell stack. Several PEMs (each one being associated with a particular fuel cell) may be dispersed throughout the stack between the anodes and cathodes of the different fuel cells. The anode and the cathode may each be made out of an electrically conductive gas diffusion material, such as a carbon cloth or paper material, for example.

Referring to FIG. 1, as an example, a fuel cell stack 10 may be formed out of repeating units called plate modules 12. In this manner, each plate module 12 includes a set of composite plates that may form several fuel cells. For example, for the arrangement depicted in FIG. 1, an exemplary plate module 12a may be formed from a cathode cooler plate 14, a bi-polar plate 16, a cathode cooler plate 18, an anode cooler plate 20, a bipolar plate 22 and an anode cooler plate 24 that are stacked from bottom to top in the listed order. The cooler plate functions as a heat exchanger by routing a coolant through flow channels in either the upper or lower surface of the cooler plate to remove heat from the plate module 12a. The surface of the cooler plate that is not used to route the coolant includes flow channels to route either hydrogen (for the anode cooler plates 18 and 24) or oxygen (for the cathode cooler plates 14 and 20) to an associated fuel cell. The bipolar plates 16 and 22 include flow channels on one surface (i.e., on the top or bottom surface) to route hydrogen to an associated fuel cell and flow channels on the opposing surface to route oxygen to another associated fuel cell. Due to this arrangement, each fuel cell may be formed in part from one bipolar plate and one cooler plate, as an example.

For example, one fuel cell of the plate module 12a may include an anode-membrane-cathode sandwich, called a membrane-electrode-assembly (MEA), that is located between the anode cooler plate 24 and the bipolar plate 22. In this manner, the upper surface of the bipolar plate 22 includes flow channels to route oxygen near the cathode of the MEA, and the lower surface of the anode cooler plate 24 includes flow channels to route hydrogen near the anode of the MEA.

As another example, another fuel cell of the plate module 12a may be formed from another MEA that is located between the bipolar plate 22 and the cathode cooler plate 20. In this manner, the lower surface of the bipolar plate 22 includes flow channels to route hydrogen near the anode of the MEA, and the upper surface of the cathode cooler plate 20 includes flow channels to route oxygen near the cathode of the MEA. The other fuel cells of the plate module 12a may be formed in a similar manner.

The number of different flow plates that are use to construct the fuel cell stack 10 contribute to the total cost of the stack 10. Thus, there is a continuing need to reduce the number of different flow plates of the stack.

SUMMARY

In one embodiment of the invention, a fuel cell stack includes flow plates that are arranged to communicate reactants through the fuel cell stack. The flow plates include an anode cooler plate that is substantially identical to a cathode cooler plate of the flow plates.

In another embodiment of the invention, a fuel cell flow plate has a design to function as an anode cooler plate in a first orientation and fiction as a cathode cooler plate in a second orientation that is rotated approximately one hundred eighty degrees from the first orientation.

Advantages and other features of the invention will become apparent from the following description, from the drawing and from the claims.

DETAILED DESCRIPTION

Figure 1:
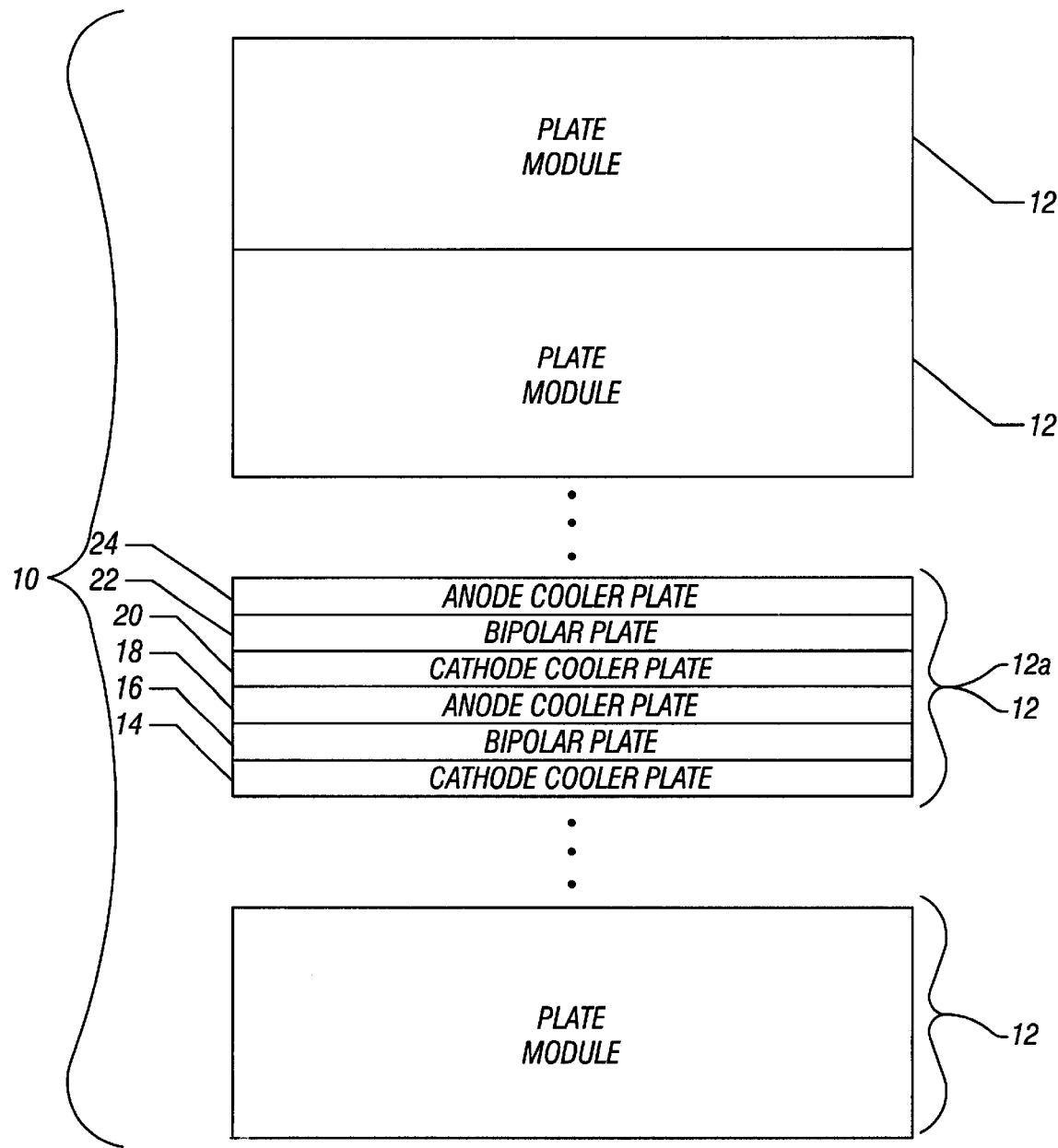
FIG. 1 is a schematic diagram illustrating a fuel cell stack according to the prior art.
Figure 2:
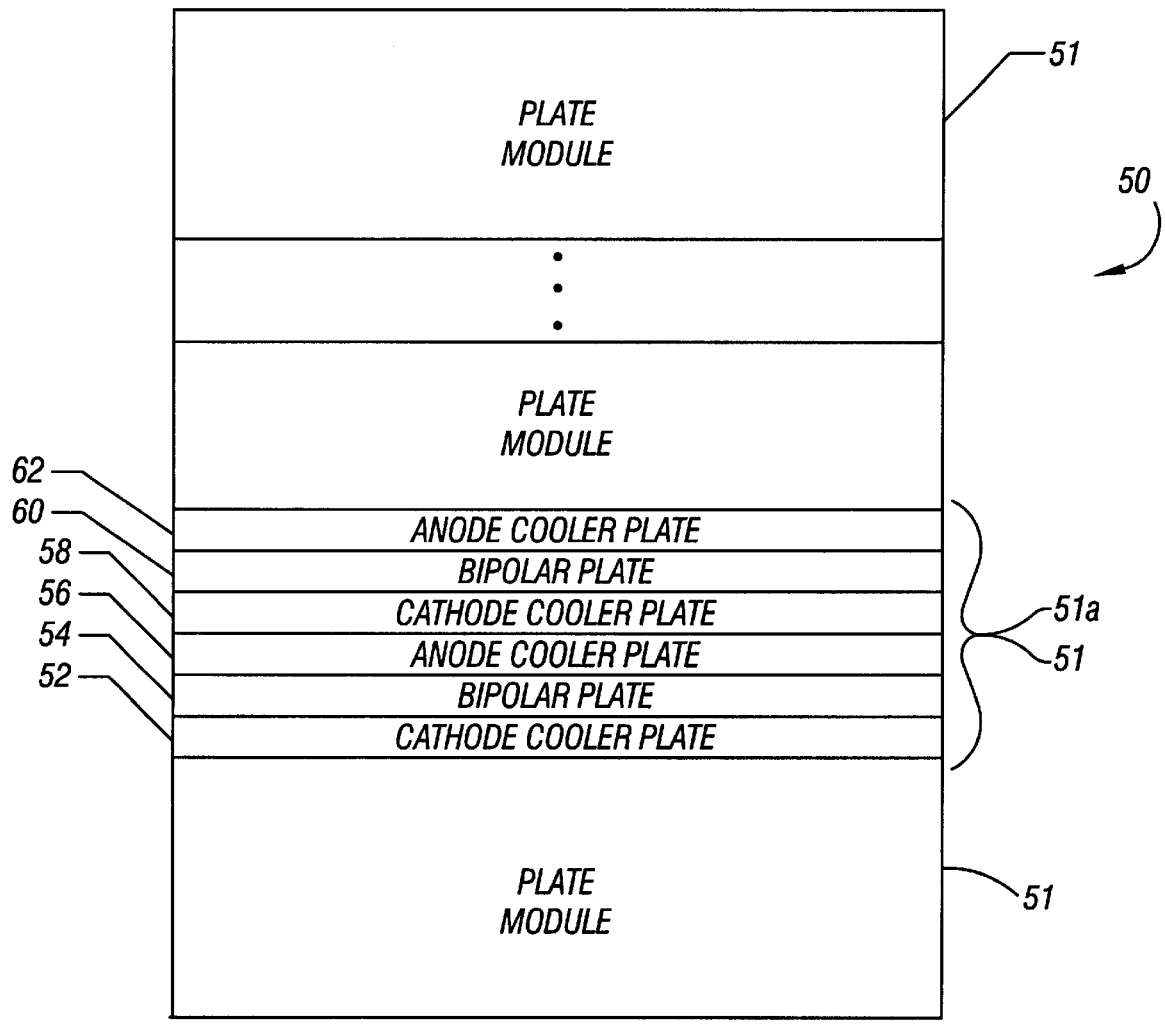
FIG. 2 is a schematic diagram illustrating a fuel cell stack according to an embodiment of the invention.

Referring to FIG. 2, an embodiment 50 of a fuel cell stack in accordance with the invention includes substantially identical flow plates that may be used either as anode cooler plates (anode cooler plates 56 and 62, as examples) or cathode cooler plates (cathode cooler plates 52 and 58, as examples). In this manner, a bi-cooler plate for use in a fuel cell stack is described herein. Due to the features of the bi-cooler plate, the bi-cooler plate may be oriented in one direction to form the anode cooler plate and may be rotated by 180° (i.e., flipped) to form the cathode cooler plate.

More specifically, the fuel cell stack 50 may be formed from repeating units called plate modules 51. An exemplary plate module 51a (having a design similar to the other plate modules 51) is depicted in FIG. 2. The plate module 51a includes flow plates (graphite composite plates or metallic plates, for example) that include flow channels to form several fuel cells as well openings to form part of the manifold passageways of the stack 50. As an example, the plate module 51a may include the following flow plates: bipolar plates 54 and 60; cathode cooler plates 52 and 58; and anode cooler plates 56 and 62.

Figure 3:
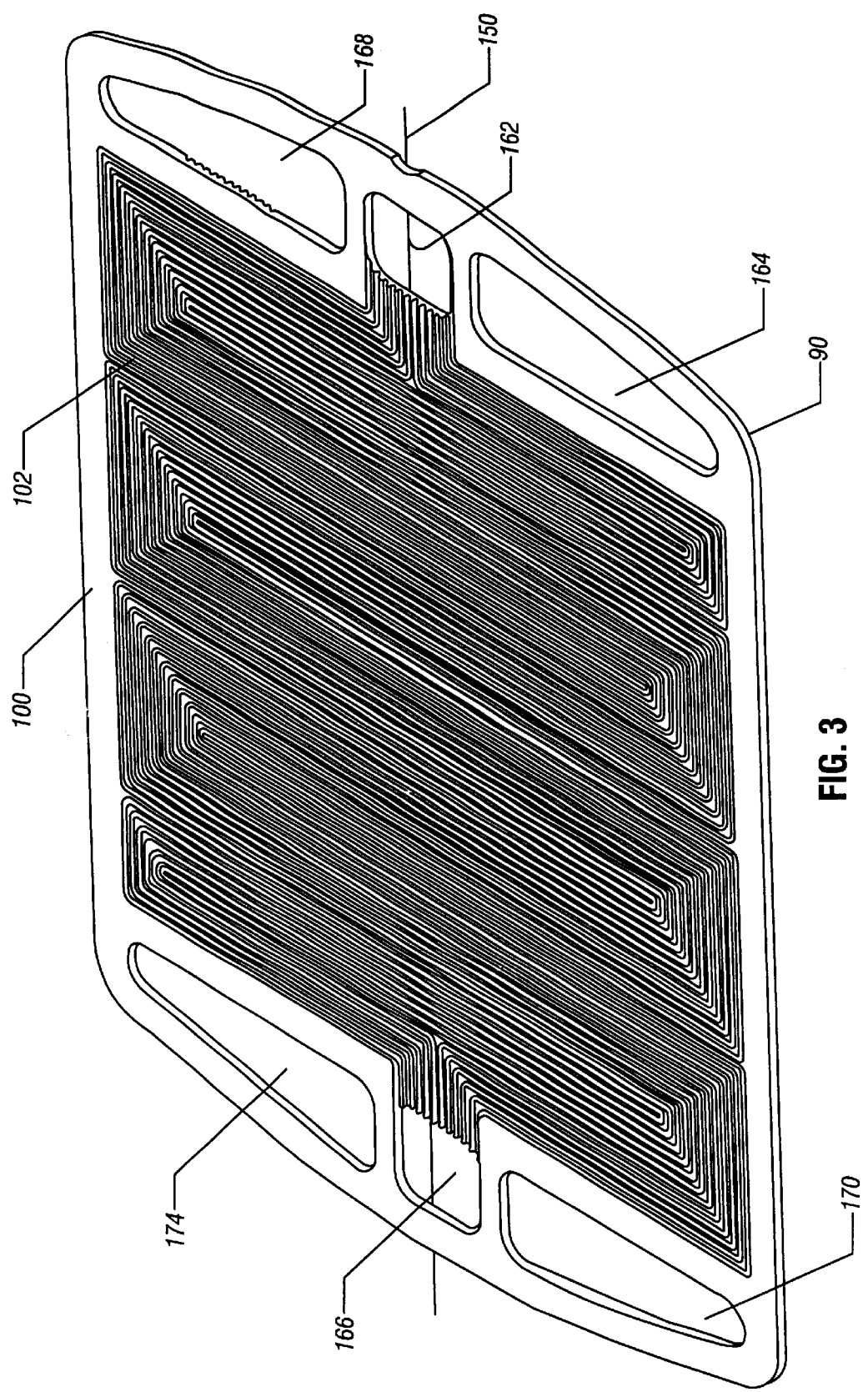
FIG. 3 is a perspective view of one side of a bi-cooler plate according to an embodiment of the invention.

FIG. 3 depicts a surface 100 of a bi-cooler plate 90, a plate that may be used as to form the anode cooler plates 56 and 62 and the cathode cooler plates 52 and 58, as described below. In this manner, the surface 100 includes flow channels 102 for communicating a coolant (Therminol D-12 made by Solutia Inc., for example) to remove heat from the fuel cell stack 50. Flow channels 120 (see FIG. 4) on an opposite surface 119 of the bi-cooler plate 90 may be used for purposes of communicating hydrogen (for an anode cooler plate configuration) or air (for a cathode cooler plate configuration) to a membrane (a proton exchange membrane (PEM), for example) of a fuel cell.

Among the features of the bi-cooler plate 90 that give rise to its dual use are the symmetry (described below) of manifold passageway openings and the absence of a gasket groove. In this manner, when used to form the anode cooler plate (the anode cooler plates 56 and 62, as examples), an opening 170 of the plate 90 forms part of a vertical inlet passageway of the manifold for introducing hydrogen to the flow channels 120 (see FIG. 4); and an opening 168 of the plate 90 forms part of a vertical outlet passageway of the manifold for removing hydrogen from the flow channels 120. Similarly, when used to form the anode cooler plate, openings 174 and 164 in the plate 90 form partial vertical inlet and outlet passageways, respectively, of the manifold for communicating an air flow (that provides oxygen to the fuel cells); and openings 162 and 166 form partial vertical inlet and outlet passageways, respectively, of the manifold for communicating the coolant to the flow channels 102 (see FIG. 3).

The symmetry of the bi-cooler plate 90 permits the plate 90 to be used in the stack 50 with either the surface 120 or the surface 119 facing in a particular direction to define the configuration (a anode cooler plate configuration or a cathode cooler plate configuration) of the bi-cooler plate 90. In this manner, the coolant passageway openings 162 and 166 are symmetric about an axis 150 of symmetry that lies in the general plane of the plate 90 and generally divides the plate 90 in half. Therefore, regardless of whether the surface 120 faces upward (for the anode cooler plate configuration) or the surface 119 faces upward (for the cathode cooler plate configuration), the coolant passageway openings 162 and 166 still align with the coolant manifold passageways that are formed by the other plates of the fuel cell stack 50.

The manifold openings for the reactants have the following symmetry. For a particular orientation, each hydrogen manifold opening has a mirroring air manifold opening about the axis 150 of symmetry. Thus, as a result of this arrangement, the reactant openings are also aligned with the appropriate manifold passageways.

For example, in some embodiments, when the bi-cooler plate 90 is used as an anode cooler plate, the opening 170 forms part of a hydrogen inlet manifold passageway, and the opening 174 that mirrors the opening 170 about the axis 150 forms part of an air inlet manifold passageway. Similarly, when the bi-cooler plate 90 is used as an anode cooler plate, the opening 168 forms part of a hydrogen outlet manifold passageway, and the opening 164 that mirrors the opening 168 about the axis 150 forms part of an air manifold outlet passageway. The flow channels 120 are therefore in communication with the hydrogen manifold passageways.

When the bi-cooler plate 90 is rotated about the axis 150 by 180° from the above-described orientation to form the cathode cooler plate, the hydrogen manifold passageway openings 168 and 170 of the anode cooler plate configuration become the new air manifold passageway openings 168 and 170 of the cathode cooler plate configuration. Thus, the flow channels 120 in the cathode cooler plate configuration communicate air instead of hydrogen.

Figure 4:
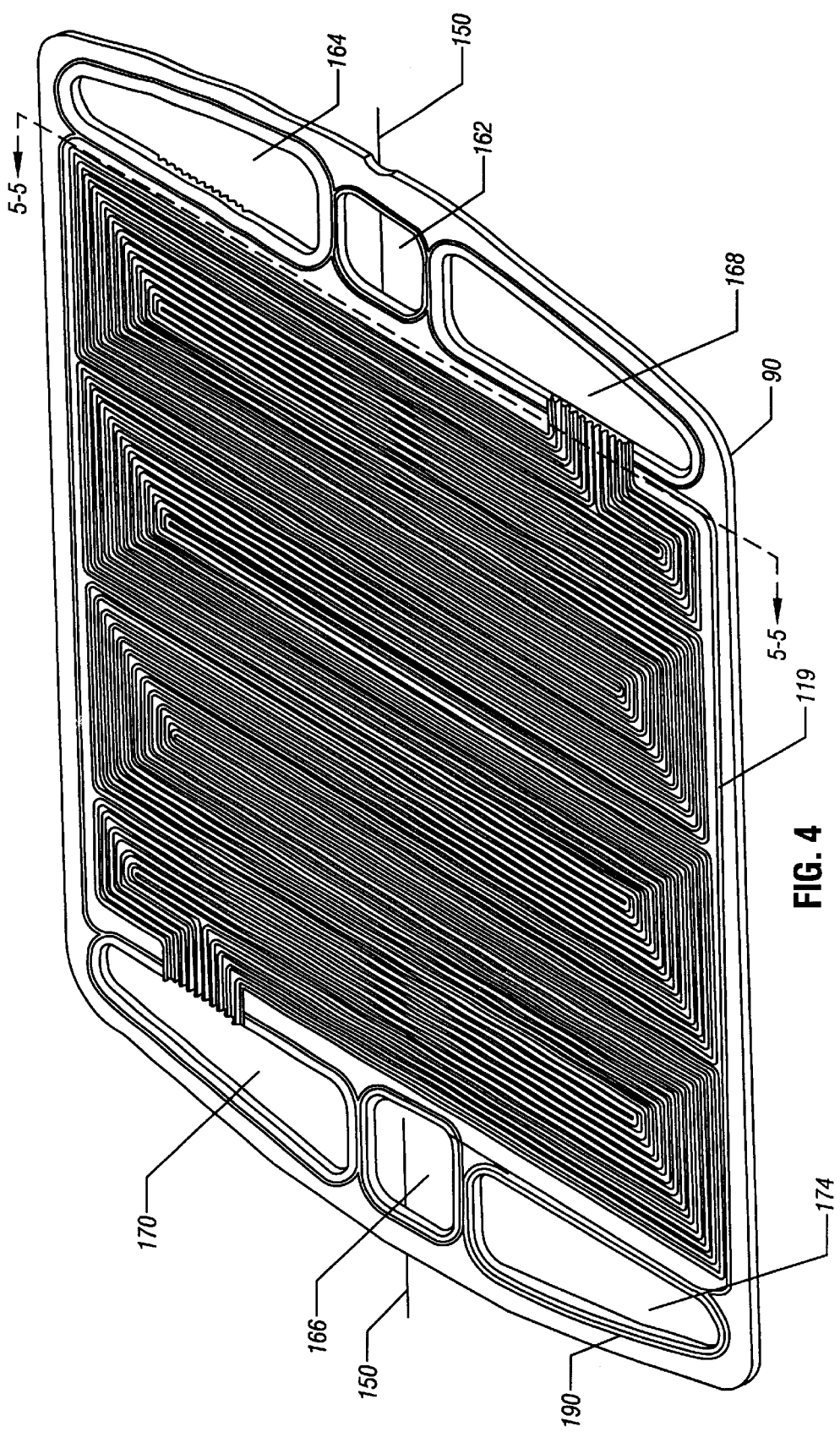
FIG. 4 is a perspective view of a gasket and the opposite side of the bi-cooler plate of FIG. 3 according to an embodiment of the invention.

Reactant manifold openings of the same type are depicted in FIGS. 3 and 4 as being diagonally opposed across the axis 150. However, similar results may be achieved if reactant manifold openings of the same type are on the same side of the axis 150. Therefore, as long as each of the hydrogen openings mirrors an air manifold opening about the axis 150, the requisite symmetry may be achieved.

Besides the above-described symmetry features of the bi-cooler plate 90, the bipolar plate 90 may have other features that aid the dual nature of the bi-cooler plate 90. For example, in some embodiments, the bipolar plate 90 may be designed so that a flow gasket 190 (see FIG. 4) may be formed on either surface 119 or 100 of the bi-cooler plate 90.

Conventionally, each flow plate includes a gasket groove on its upper surface to receive a flow gasket. Thus, the gasket groove defines the "up side" of the flow plate. However, the gasket 190 may be adhered to either side of the bi-cooler plate 90, and thus, the bi-cooler plate 90 may not include a gasket groove, a feature that defines an orientation of the plate.

In some embodiments, the flow gasket 190 may be formed on either surface 119 or 100 of the bi-cooler plate 90. More particularly, the gasket 190 is formed on a substantially flat surface sealing region of the bipolar plate 90 that either exists on the surface 119 (for the cathode cooler plate configuration) or on the surface 120 (for the anode cooler plate configuration).

Figure 5:
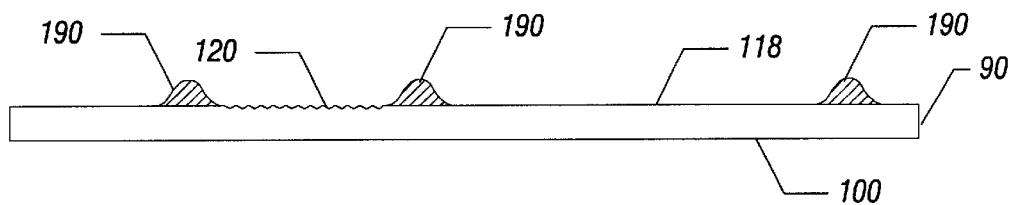
FIG. 5 is a cross-sectional view of the bi-cooler plate and the gasket taken along line 5—5 of FIG. 4.
Figure 6:
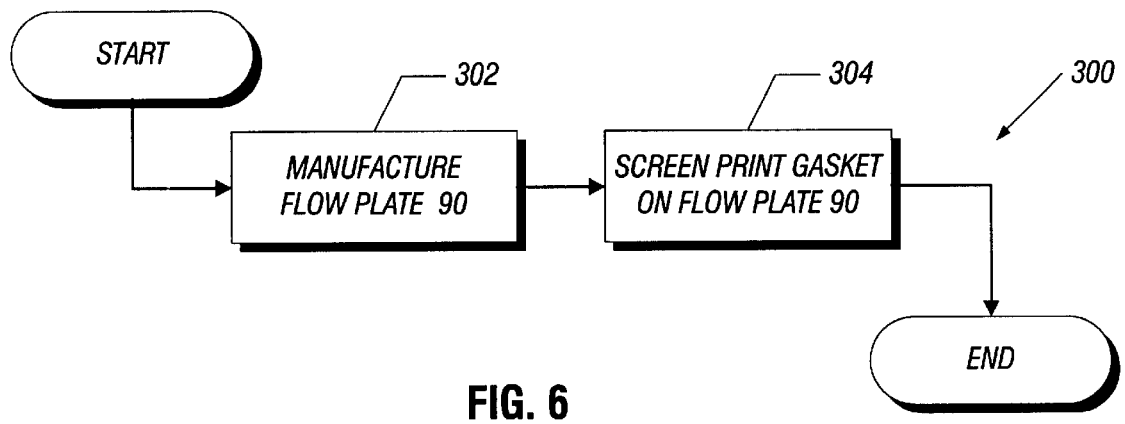
FIGS. 6 and 7 are flow diagrams depicting techniques to form the gasket on the fuel cell flow plate.

To accomplish this, the gasket 190 may be formed in a manner that bonds the gasket 190 to the surface of the bi-cooler plate 90, as depicted in a cross-sectional view of the bi-cooler plate 90 in FIG. 5 when oriented to be in the anode cooler plate configuration. For example, referring to FIG. 6, in one technique (generally depicted by reference numeral 300), the bi-cooler plate 90 is manufactured (block 302) before a decision is made whether the bipolar plate 90 is going to be used as an anode cooler plate or as a cathode cooler plate. Based on this decision, an appropriate surface of the bipolar plate 90 is selected and screen printing (block 304) may be used to form the gasket 190.

Figure 7:
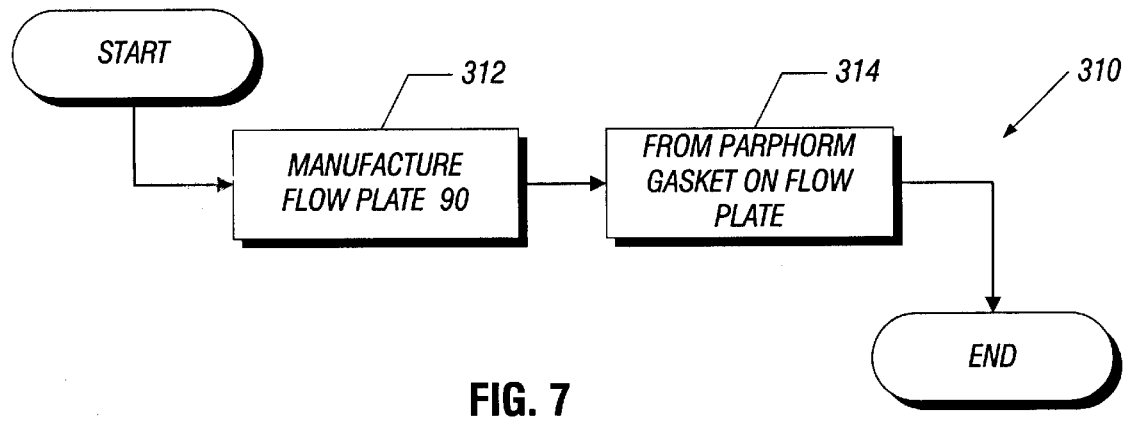

Alternatively, in another technique 310 (see FIG. 7), the bipolar plate 90 is manufactured (block 312) and a paraphorm seal may be formed (block 314) by a robot that applies a thin paraphonn bead, for example, on the appropriate surface of the bi-cooler plate 90. Other techniques to form the gasket 190 directly on the surface of the bi-cooler plate 90 may be used.

In the preceding description, directional terms, such as "upper," "lower," "vertical" and "horizontal," may have been used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by approximately 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell stack comprising:

flow plates arranged to communicate reactants through the fuel cell stack, the flow plates including an anode cooler plate that is substantially identical to a cathode cooler plate of the flow plates.

2. The fuel cell stack of claim 1, further comprising a flow gasket to seal regions of one of the cathode and anode cooler plates, the gasket being mounted on a substantially flat surface of said one of the cathode and anode cooler plates.

3. The fuel cell stack of claim 2, wherein the substantially flat surface does not include a gasket groove.

4. The fuel cell stack of claim 2, wherein the gasket comprises a paraphorm seal gasket.

5. The fuel cell stack of claim 2, wherein the gasket comprises a screen printed gasket.

6. The fuel cell stack of claim 1, wherein each of the anode and cathode cooler plates includes at least one coolant manifold passageway opening symmetrically arranged about an axis, an air manifold passageway opening, and a hydrogen manifold passageway opening mirroring the air manifold passageway opening about the axis.

7. The fuel cell stack of claim 1, wherein the anode cooler plate has an orientation that is rotated by approximately 180 degrees from the orientation of the cathode cooler plate.

8. The fuel cell stack of claim 1, wherein the anode cooler plate includes flow channels to communicate fuel to a fuel cell.

9. The fuel cell stack of claim 8, wherein the flow channels comprises serpentine flow channels.

10. The fuel cell stack of claim 1, wherein the anode cooler plate includes flow channels to communicate hydrogen to a fuel cell.

11. The fuel cell stack of claim 10, wherein the flow channels comprises serpentine flow channels.

12. The fuel cell stack of claim 1, wherein each of the anode and cathode plates comprises a graphite composite plate.

13. A fuel cell flow plate having a design to function as an anode cooler plate in a first orientation in a fuel cell stack and function as a cathode cooler plate in a second orientation in the fuel cell stack, the second orientation being rotated approximately one hundred eighty degrees from the first orientation.

14. The fuel cell flow plate of claim 13, further comprising a substantially flat surface to mount a flow gasket to seal regions of the fuel cell flow plate.

15. The fuel cell flow plate of claim 14, wherein the substantially flat surface does not include a gasket groove.

16. The fuel cell flow plate of claim 14, wherein the gasket comprises a paraphorm seal gasket.

17. The fuel cell flow plate of claim 14, wherein the gasket comprises a screen printed gasket.

18. The fuel cell flow plate of claim 14, including at least one coolant manifold passageway opening symmetrically arranged about an axis, an air manifold passageway opening, and a hydrogen manifold passageway opening mirroring the air manifold passageway opening about the axis.

19. The fuel cell flow plate of claim 14, wherein the fuel cell flow plate comprises a bi-cooler plate.

20. The fuel cell flow plate of claim 14, wherein the fuel cell flow plate comprises serpentine flow channels to communicate a reactant to fuel cell.

21. The fuel cell flow plate of claim 14, wherein the fuel cell flow plate comprises serpentine flow channels to communicate a coolant.

22. A method for forming a fuel cell stack, comprising:

arranging flow plates to communicate reactants through the fuel cell stack;

using one of the plates to form an anode cooler plate of the fuel cell stack; and using another one of the plates to form a cathode cooler plate of the fuel cell stack, the cathode cooler plate being substantially identical to the anode cooler plate.

23. The method of claim 22, further comprising:

using a flow gasket to seal regions of one of the anode and cathode cooler plates without mounting the flow gasket in a gasket groove of the said one of the anode and cathode cooler plates.

24. The method of claim 22, wherein the gasket comprises a paraphorm seal gasket.

25. The method of claim 22, wherein the gasket comprises a screen printed gasket.

26. The method of claim 22, further comprising:

forming at least one coolant manifold passageway opening in each of the anode and cathode cooler plates so that said at least one coolant manifold passageway opening is symmetrically arranged about an axis;

forming an air manifold passageway opening in each of the anode and cathode cooler plates; and forming a hydrogen manifold passageway in each of the anode and cathode cooler plates to mirror the air manifold passageway in said each of the anode and cathode cooler plates.

27. The method of claim 22, further comprising:

rotating an orientation of the anode cooler plate by approximately 180 degrees from an orientation of the cathode cooler plate.

28. The method of claim 22, wherein the fuel cell flow plate comprises serpentine flow channels to communicate a reactant to fuel cell.

29. The method of claim 22, wherein the fuel cell flow plate comprises serpentine flow channels to communicate a coolant.

* * * * *